United States Patent
Datta

(10) Patent No.: US 7,414,331 B2
(45) Date of Patent: Aug. 19, 2008

(54) POWER CONVERTER SYSTEM AND METHOD

(75) Inventor: Rajib Datta, Albany, NY (US)

(73) Assignee: General Electric Company, Niskayuna, NY (US)

( * ) Notice: Subject to any disclaimer, the term of this patent is extended or adjusted under 35 U.S.C. 154(b) by 663 days.

(21) Appl. No.: 10/813,823

(22) Filed: Mar. 31, 2004

(65) Prior Publication Data

US 2005/0225908 A1    Oct. 13, 2005

(51) Int. Cl.
H02J 3/00        (2006.01)
H02H 7/04       (2006.01)

(52) U.S. Cl. .............................. 307/71; 307/54; 307/58; 307/61; 361/38

(58) Field of Classification Search ............... 307/54, 307/58, 61, 71; 361/38
See application file for complete search history.

(56) References Cited

U.S. PATENT DOCUMENTS 3,846,695 A * 11/1974 Genuit et al. ................. 363/71
5,001,623 A * 3/1991 Magid ......................... 363/143
5,343,080 A * 8/1994 Kammeter ................... 307/105
6,486,640 B2 * 11/2002 Adams ......................... 322/59
6,897,577 B2 * 5/2005 Weeber et al. ................ 290/52
6,945,052 B2 * 9/2005 Frutschi et al. ............... 60/772

OTHER PUBLICATIONS

Saccomando, et al "Improving Voltage Disturbance Rejection for Variable-Speed Wind Turbines", IEEE Transactions on Energy Conversion, vol. 17, No. 3, pp. 422-428, Sep. 2002.
Jouko Niiranen, "Voltage dip ride through of a doubly-fed generator equipped with an active crowbar", Nordic Wind Power Conference, Chalmers University of Technology, Mar. 1-2, 2004.
Awad, et al "Compensation of Unbalanced Voltage Dips using Vector-Controlled Static Series Compensator with LC-Filter", 0-7803-7420-7/02, IEEE 2002, pp. 904-910.

* cited by examiner

Primary Examiner—Michael J Sherry
Assistant Examiner—Hal I Kaplan
(74) Attorney, Agent, or Firm—Fletcher Yoder

(57) ABSTRACT

A power system for supplying power to a load is provided. The power system comprises a converter system comprising a first converter and a second converter and configured for operating in a first mode and a second mode. The first converter and the second converter are configured to be coupled in series during the first mode, and in parallel when operating in the fault mode.

14 Claims, 5 Drawing Sheets

POWER CONVERTER SYSTEM AND METHOD

BACKGROUND

The invention relates generally to power supply systems and more specifically to a system and method for a power converter to supply fault currents without over-rating.

Many devices, such as power supply systems, operate on power drawn from generators. The generator, in turn, draws power from systems such as wind turbines, gas or diesel-driven engines, turbines, or any other suitable drive system. Converter systems are usually designed to draw power from the generator and to provide the power either to a fixed frequency power grid or at a desired frequency to various loads. In other applications, such as motors, power converters are designed to draw power from a grid and provide the power to the motor.

In some applications, when there is a failure at the load, the converter systems are required to provide fault currents to the load for several cycles of the fundamental voltage. Typically, the fault current is of relatively high value. The fault current is provided to ensure the timely protection of the load. In most power electronic applications, the time interval required by the protection system to respond amounts to steady state operation for the power electronic equipment.

In order to withstand high fault current, such converters are often over-rated. Over-rating the converter system results in bulky and oversized converter systems due to larger size of devices and thermal management system, passive components like dc-link capacitors and filter inductors. In addition, the increase in components also results in an increase in the cost of the converter system.

Another requirement of converter systems is to comply with standards of harmonic injections or perturbations to the system to which power is applied (e.g. a power grid). The switching frequency of most converter systems is limited to a few hundred hertz, resulting large harmonic distortion. The harmonic distortion can be corrected by using a filter comprising large passive components. However, this again results in making the converter system bulky and heavy.

Therefore, there is a need to design a compact and cost effective converter system for withstanding high fault currents during fault conditions and effectively filtering harmonic components.

BRIEF DESCRIPTION

Briefly, in accordance with one embodiment of the invention, a power system for supplying power to a load is provided. The power system comprises a converter system comprising a first converter and a second converter. The converter system is configured for operating in a first mode and a second mode. The first converter and the second converter are configured to be coupled in series during the first mode and in parallel when operating in the second mode In a further embodiment of the invention a power system for supplying power to a load is provided. The power system comprises a converter system comprising a first converter and a second converter. The converter system is configured for operating in a normal mode and a fault mode. The first converter and the second converter are configured to be coupled in series during the normal mode and in parallel during the fault mode. The power system further comprises a transformer having a primary winding comprising a normal winding and a fault winding. The normal winding is coupled to the converters during the normal mode. The normal winding and the fault winding are coupled to the first converter and the second converter during the fault mode. The system further comprises a switching circuit coupled to the transformer and configured to couple the fault winding to the first converter and the second converter, and a sensing circuit coupled to the switching circuit and configured to sense an electrical parameter of the transformer. In addition, the system further comprises control circuitry coupled to the sensing circuit and the switching circuit and configured to change a state of the switching circuit based on the sensed electrical parameter.

In another embodiment of the invention a method for supplying power to a load is provided. The method comprises sensing an electrical parameter and coupling a first converter and a second converter in series during a normal mode and in parallel during a second mode.

In a further embodiment, a method for supplying power to a load is provided. The method comprises applying power to a transformer via a first converter and second converter electrically coupled in series with one another. The method further comprises sensing an electrical parameter and generating a control signal based on the sensed electrical parameter. In addition, the method comprises applying the control signal to a switching circuit configured to switch the first and second converter to an electrically parallel configuration.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
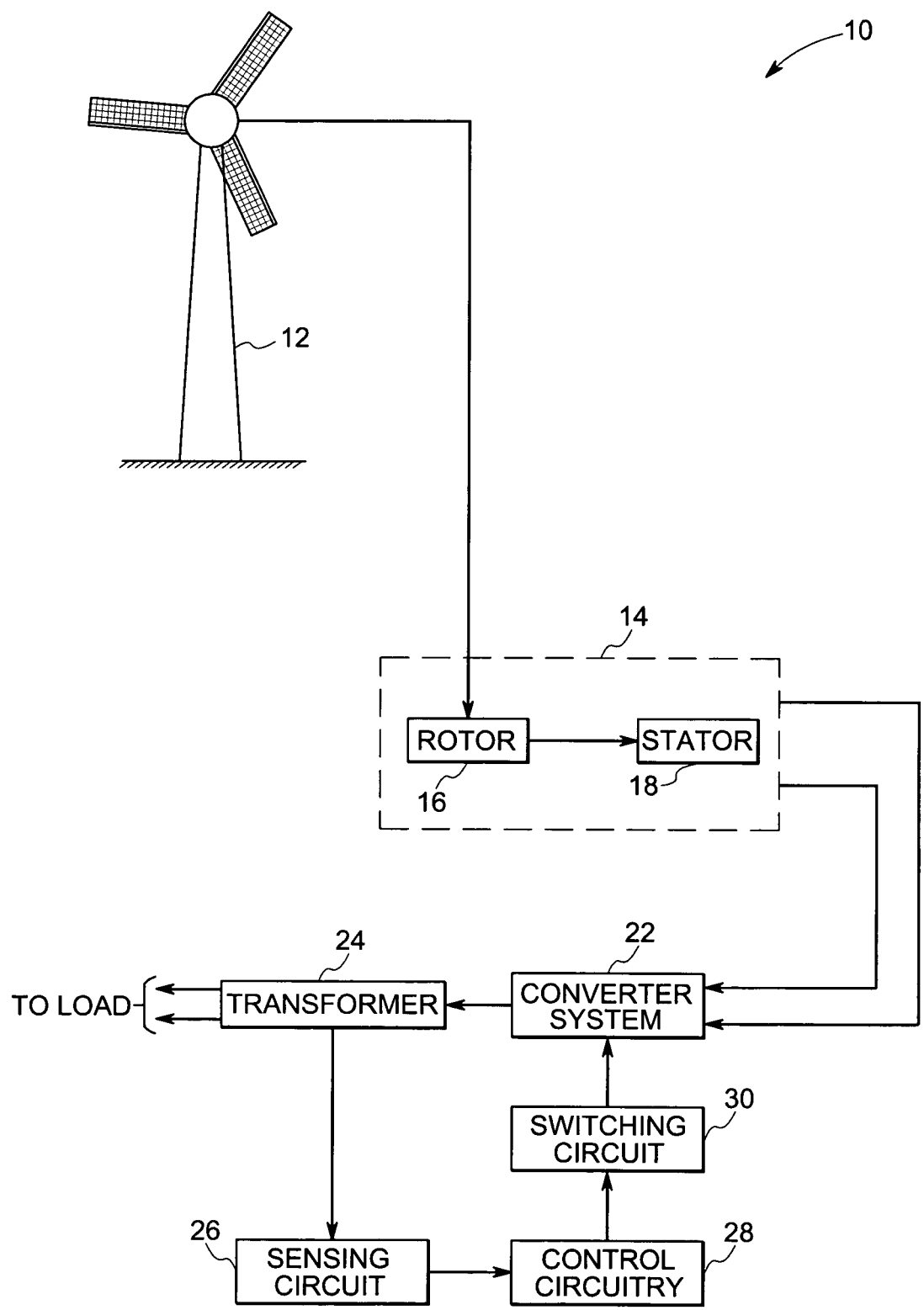
FIG. 1 is a block diagram of one embodiment of a power system implemented according to one aspect of the invention.

FIG. 1 is a block diagram of one embodiment of power system 10 implemented according to one aspect of the invention. Power system 10 is configured for supplying power to a load. Examples of load include grid, motors, resistive loads, etc.

A wind turbine 12 is configured for converting wind energy to mechanical energy. Wind energy is captured by the rotation of the wind turbine's blades. The tips of the blades travel at a speed ranging typically from about 50 m/s to 70 m/s. Mechanical power generated by the blades is transferred to a transmission system (not shown), which typically has an input of 20-50 rotations per minute (rpm) from a low-speed shaft attached to the blade and an output of 1000-1500 rpm for a high-speed shaft that is coupled to generator 14. In certain embodiments, the turbine 12 of FIG. 1 may be a gas turbine or another suitable drive system as discussed above.

Generator 14 comprises rotor 16 and stator 18, respectively, and is configured for generating a variable frequency output power. Rotor 16 typically comprises magnetic elements and is configured to provide an electromagnetic field. Stator 18 is coupled to a shaft that is in motion due to the rotational motion of the wind turbine. Due to the motion of the stator, the electromagnetic field is cut and a corresponding alternating current is produced. The alternating current is provided to converter system 22.

Converter system 22 is configured for converting the variable frequency output power received from generator 14 to a constant frequency output power. Typically, the constant frequency ranges between 49-60 Hertz. Converter system 22 is configured for operating in a first mode and a second mode. Converter system 22 comprises a first converter and a second converter configured to be coupled in series during the first mode, and in parallel when operating in the second, sometimes referred to herein as the fault mode. During the first mode the converter system is configured for supplying less current at a higher voltage, and during the second mode a higher current at a lower voltage.

It should be noted that the wind turbine system shown and described herein is discussed for exemplary purposes only. Many other types of power generation systems can be envisaged for providing power to the downstream circuitry described below both during first or normal modes of operation, and second, special or fault modes. Similarly, as will be appreciated by those skilled in the art, the particular circuitry needed for conversion of the output of such power generation equipment may vary, particularly depending upon the electrical characteristics of the output power (e.g. voltage, current and frequency).

Transformer 24 comprises two windings, namely a primary winding and a secondary winding. The primary winding and secondary winding will be illustrated and described in detail with reference to FIG. 2. The primary winding comprises a normal winding and a fault winding. The converter is coupled to the normal winding when operating in the first mode, and to the normal winding and the fault winding when operating in the second mode.

In a further embodiment, converter system 22 further comprises a third converter coupled to the fault winding of the transformer. Where provided, the third converter is configured to sense harmonic currents in the normal winding when the first and second converters are operating in a normal mode, and to induce a current equal in magnitude to the harmonic current but of the opposite phase. Thus the harmonic current is canceled and the output at the secondary has minimum harmonics.

In one embodiment, the third converter is rated at a fraction of the first converter. In addition, the third converter is configured for switching at high frequencies in the order of 5-10 KHz. The third converter is further coupled to generator to meet various application needs. In the illustrated embodiment, the third converter is coupled to the generator to provide a torque for a controlled rotation of the prime-mover to specific angular positions during assembly of the wind turbine blades or during maintenance.

In another embodiment, third converter is configured for providing power to a gas-turbine generation system for achieving a controlled start-up. When the generator gains a certain speed, the third converter is disconnected from the machine terminals and the gas-turbine is fired to further accelerate the generator to its rated speed.

Sensing circuit 26 is coupled to the transformer 24 and is configured to sense an electrical parameter of the transformer. In one embodiment, the sensing circuit is configured to sense the electrical parameter at the secondary winding of the transformer. In a further embodiment, the sensing circuit is configured to sense the electrical parameter at the secondary winding of the transformer. The electrical parameter includes current and/or voltage.

Control circuit 28 is configured to change the operation of the converter system 22 based on the sensed parameter. When the sensed parameter is beyond a threshold value, control circuitry 28 is configured for providing control signals to switching circuit 30. Switching circuit 30 is configured for coupling the converters in a parallel configuration in response to such control signals, and for restoring the converters to a series configuration for return to the first or normal mode of operation. Switching circuit 30 is further configured for coupling the fault winding to the converter system. The converter system thus works in a second mode if the sensed electrical parameter is beyond a threshold level. The converter system 22 is described in further detail below with reference to FIG. 2.

Figure 2:
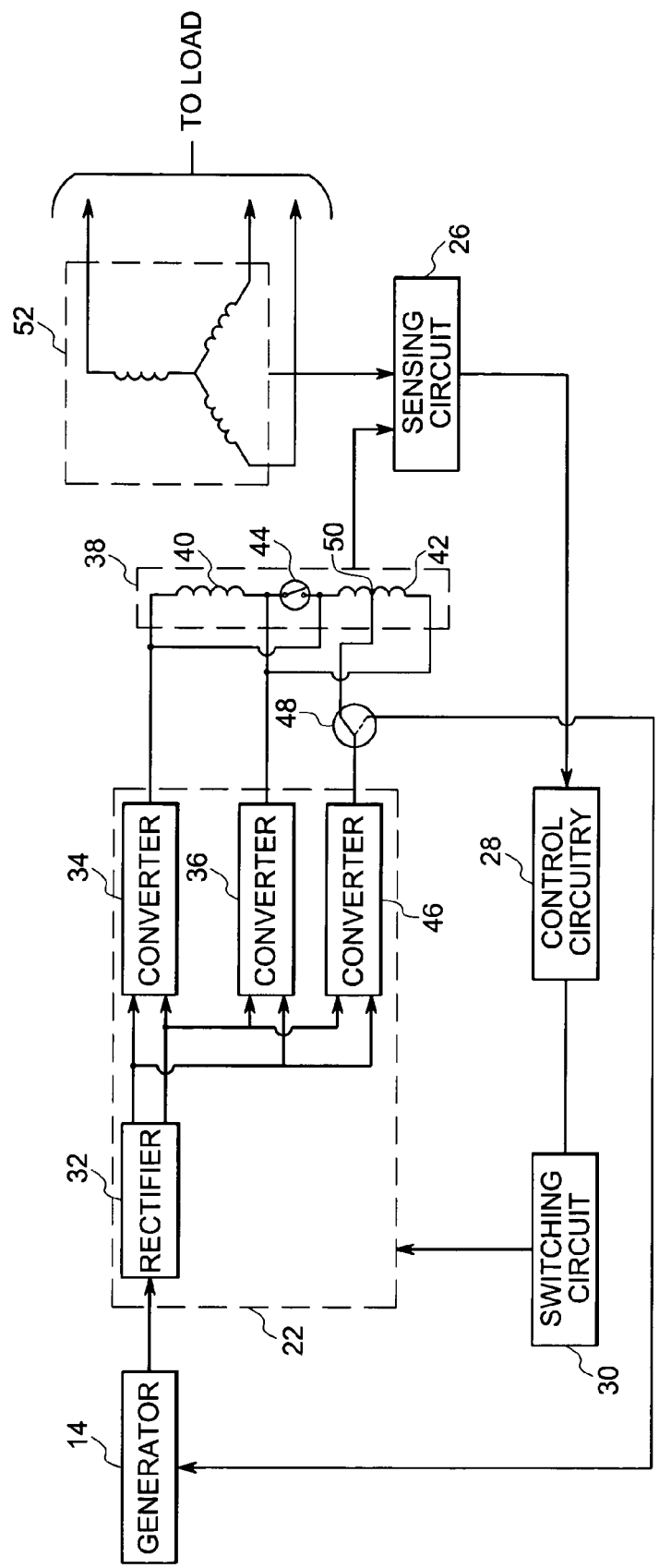
FIG. 2 is a detailed diagram of a power system shown in FIG. 1 implemented according to one aspect of the invention.

FIG. 2 is a detailed diagram of a power system shown in FIG. 1 implemented according to one aspect of the invention. Converter system 22 is shown comprising rectifier 32, first converter 34, second converter 36 and third converter 46 respectively. Rectifier 32 is configured to rectify an input alternating current received from the generator 14. The rectified output is provided to converters 32, 34 and 46 respectively. Other ancillary circuitry may, of course, be provided where appropriate, such as circuitry for filtering, stabilizing or otherwise conditioning the output of the rectifier. It should also be noted that the converters may function under the control of the control circuitry 28 for their normal operation in synthesizing the desired output waveforms, or other, separate control circuitry may be provided for this purpose. As will be appreciated by those skilled in the art, the control circuitry will operate by changing the conductive state of switches within the converters, described in greater detail below, to produce the output waveforms, typically pulse-width modulated waveforms at desired frequencies (e.g. as needed for a load, or matching the frequency of a grid to which power is applied).

First converter 34 and second converter 36 are each coupled to primary winding 38 of transformer 24. Primary winding 38 comprises a normal winding 40 and a fault winding 42. The normal winding 40 is coupled to the fault winding 42 via switch 44. When operating in a normal mode, converters 34 and 36 are each coupled to the normal winding 40 of the transformer. In addition the first and second converters are coupled to each other in series when operating in the normal mode. In a further embodiment, the first and second converters comprise a rating of approximately half of a nominal power rating of the power system.

In one embodiment, when the first and second converters are working in normal mode, the normal winding of the primary winding is coupled to the first and second converters. The transformer has an open winding secondary receiving power from both the converters 34 and 36 from both ends, resulting in a multilevel waveform. The resulting switching frequency across the secondary winding is twice the switching frequency of first converter 34 and second converter 36. In a more specific embodiment, both converters are operated in current control mode.

Third converter 46 receives rectified output from rectifier 32. When operating in the normal mode, the third converter 46 is coupled to the fault winding 42 of the transformer via switch 48. In one embodiment, the third converter is coupled to the mid-point 50 of the fault winding 42 via switch 48. In one embodiment, the switch 48 is implemented using a single-pole double-throw switch. Other switch configurations may, of course, be provided for interconnecting the third converter and the transformer winding.

The third converter is configured for sensing harmonic currents in the normal winding, when the first and second converters are operating in a normal mode. The third converter is configured to induce a current equal in magnitude to the harmonic current but of the opposite phase. The harmonic currents are effectively canceled thus precluding or reducing application of such harmonics to the load or grid to which the transformer is coupled.

In addition, the third converter is further coupled to generator to meet various application needs. In the illustrated embodiment, the third converter is coupled to the generator to provide a torque for a controlled rotation of the prime-mover to specific angular positions during assembly of the wind turbine blades or during maintenance of the wind turbine.

In another embodiment, the third converter is configured for providing power to a gas-turbine generation system for achieving a controlled start-up. When the generator gains a certain speed, the third converter is disconnected from the machine terminals and the gas-turbine is fired to further accelerate the generator to its rated speed.

Sensing circuit 26 is configured for sensing an electrical parameter of the transformer 24 or of the circuitry coupled to the transformer. When the electrical parameter exceeds a threshold value, the converter system operates in a fault mode. The control circuitry receives signals from the sensing circuit 26 and provides control signals to switching circuit 30. The switching circuit is configured to couple the converters 34 and 36 in parallel when the converter system is operating in the fault mode. In addition, the switch 44 selectively couples the fault winding 42 to the normal winding 40. Thus, the normal winding 40 and the fault winding 42 are coupled to the converters 34 and 36, respectively, when the converter system is operating in the fault mode. A more detailed description of the converter system and associated circuitry is provided below.

Figure 3:
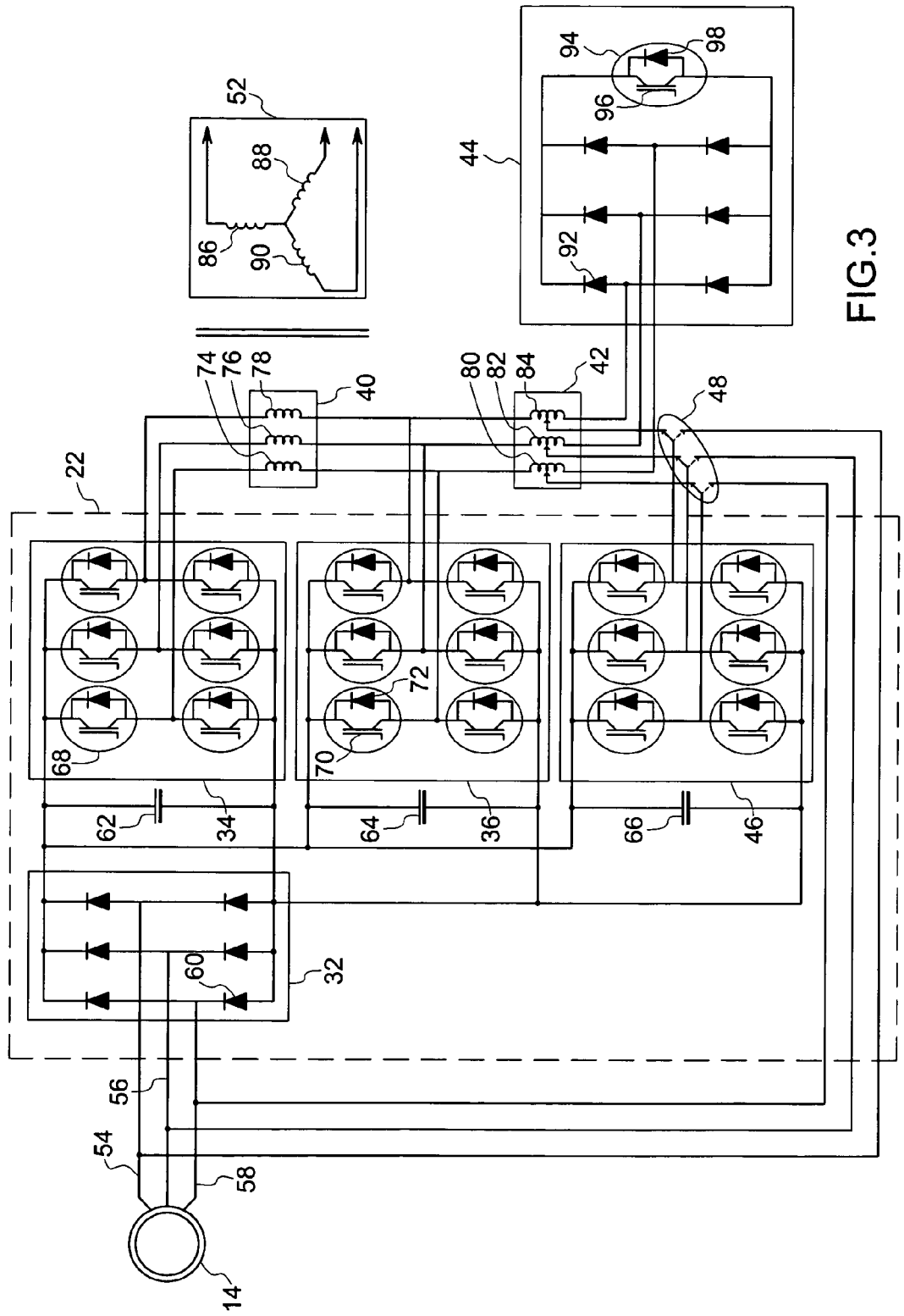
FIG. 3 is a circuit diagram of one embodiment of the converter system and associated circuitry implemented according to one aspect of the invention.

FIG. 3 is a circuit diagram illustrating an exemplary manner of implementing converter system 22 and associated circuitry according to one aspect of the invention. As illustrated in FIG. 3, the rectifier 32 receives a variable frequency output power from generator 14 on output terminals 54, 56 and 58. Rectifier 32, in the illustrated embodiment, is a three-phase rectifier circuit and is implemented using diodes 60. Rectifier 32 comprises three legs, each leg comprising two diodes connected in series. Each output terminal of generator 14 is coupled to a corresponding leg of the rectifier 32. At any instant of time, only one diode 60 from each leg is active (i.e. conducting). Thus, the output of the generator 14 is rectified by rectifier 32 and supplied to dc-link capacitors 62, 64 and 66. It may be noted that rectifier 32 may be implemented using insulated gate bipolar transistors, insulated gate controlled thyristors, and/or silicon controlled rectifiers.

First converter 34 and second converter 36 are configured to draw power from the charge stored in dc link capacitors 62 and 64. Each converter includes three pairs of active switching devices 68 arranged as shown in FIG. 3. Each switching device 68 comprises an active switch 70 and diode 72 coupled in parallel to the active switch. At any instant of time, one switching device of each pair is in a conducting state, while the other switching device for the same output phase is in a non-conducting state. Thus, the switching devices switch alternatively to generate an alternating output of a desired frequency, based upon the control signals applied to the switching devices. In one embodiment, the active switches are implemented as insulated gate bipolar transistors (IGBT), or insulated gate controlled thyristors (IGCTs), etc.

The alternating output from the converters is provided to the normal winding 40 and the fault winding 42 of transformer 24. Normal winding 40 comprises three phase windings, namely phase 'a' represented by reference numeral 74, phase 'b' represented by reference numeral 76, phase 'c' represented by reference numeral 78. Similarly, fault winding 42 comprises three phase windings, namely phase 'a' represented by reference numeral 80, phase 'b' represented by reference numeral 82, phase 'c' represented by reference numeral 84. Similarly, secondary winding 52 comprises three phase windings, namely phase 'a' represented by reference numeral 86, phase 'b' represented by reference numeral 88, phase 'c' represented by reference numeral 90.

Third converter 46 is implemented in a similar manner as first converter 34 and second converter 36. When the first and second converters are operating in the normal mode, the third converter is coupled to the fault winding. Each pair of switching devices is coupled to a corresponding phase winding of the fault winding 42 via switches 48. Third converter 46 is configured to sense a harmonic current in the normal winding and induce an equal current but of opposite polarity in the fault winding, thus effectively canceling the harmonic current at the transformer output.

As noted above, third converter 46 is coupled to generator 14 via switch 48. In the illustrated embodiment, the third converter is coupled to the generator to provide a torque for a controlled rotation of the prime-mover to specific angular positions during assembly of the wind turbine blades or during maintenance of the wind turbine.

In another embodiment, the third converter is configured for providing power to a gas-turbine generation system for achieving a controlled start-up. When the generator gains a certain speed, the third converter is disconnected from the machine terminals and the gas-turbine is fired to further accelerate the generator to its rated speed.

When the converter system is operating in a fault mode, the fault winding of the transformer is coupled to the normal winding via switch 44. In one embodiment, switch 44 comprises diodes 92 and a switching circuit 94. In the exemplary embodiment shown, switching circuit 94 is implemented in a manner similar to switching circuit 70, and comprises transistor 96 and diode 98. The operation of the converter system 22 and the transformer 24 during the fault mode is described in detail below.

By way of example only, if the maximum voltage that can be supported by the transformer 24 is 0.5 pu and the fault winding has same number of turns as the normal winding, then during a fault condition the converter system may have to support more than 0.5 pu. If the normal winding and the fault winding are wound on the same phase of the transformer, the first converter 34 may have to support more than 0.5 pu. Because the converters can only support 0.5 pu, the fault winding voltage is derived from a different phase and the primary winding is wound in a zigzag pattern.

Figure 4:
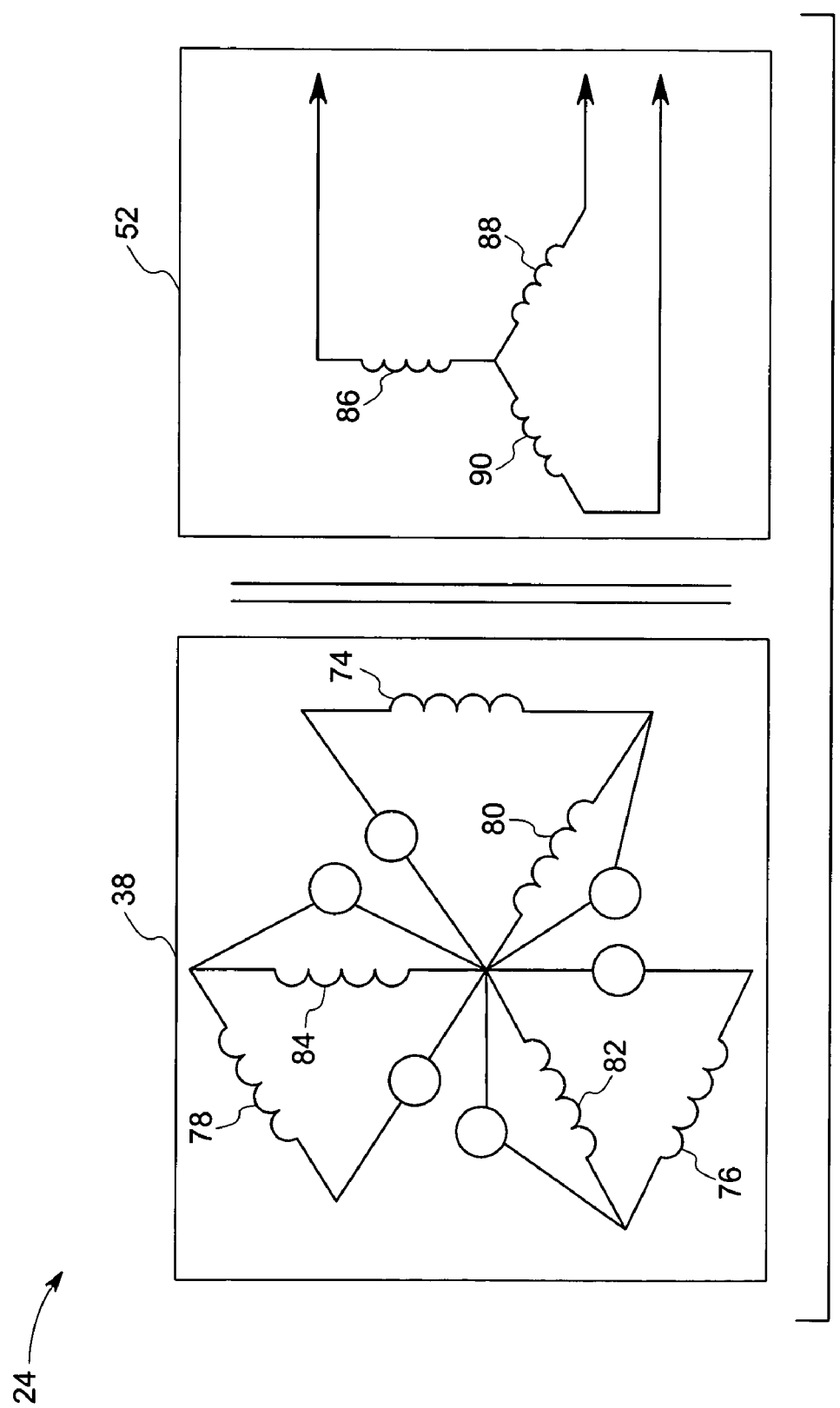
FIG. 4 is a diagrammatical view illustrating an example transformer configuration implemented according to one aspect of the invention.

FIG. 4 is an illustration of an example transformer configuration that has a resultant line-to-neutral voltage of 0.5 pu. The normal winding of the primary winding comprises three phases a, b and c represented by 74, 76 and 78 respectively. Similarly, the fault winding of the primary winding comprises three phases a, b and c represented by 80, 82 and 84 respectively. Similarly, the secondary winding has three phases a, b and c represented by 86, 88 and 90 respectively.

The illustrated configuration allows the current from both the converters to be controlled independently at any phase. It should be noted that, due to the winding configuration, the currents reflected in the secondary would be the vector sum of the normal winding current in one phase and the fault winding current derived from another phase.

Figure 5:
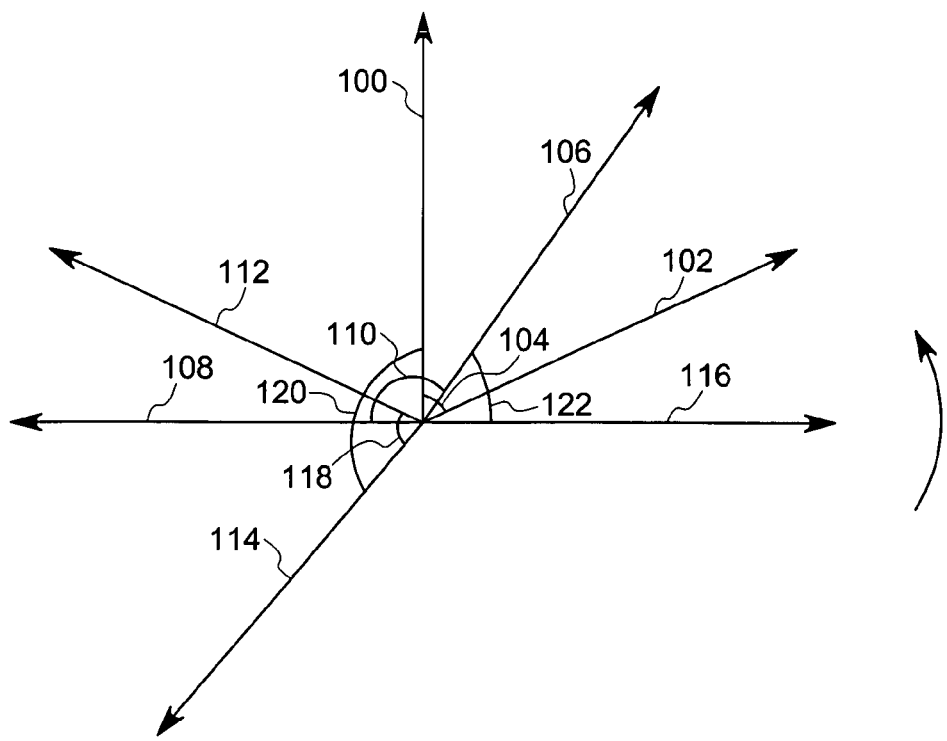
FIG. 5 is a phasor diagram illustrating the various currents in the primary winding and the secondary winding of a transformer.

FIG. 5 is a phasor diagram illustrating the various currents in the primary winding and the secondary winding of transformer 24. In the primary of the transformer, in phase 'a', a phase displacement of 60° represented by reference numeral 104, exists between current in first converter 34 as designated by reference numeral 100 and the current in converter 36, as designated by reference numeral 102. As a result, the current in the fault winding in phase 'a', designated by reference numeral 106 is 1.732 pu. In a balanced transformer, the fault winding current in phase 'c' of the transformer, designated by reference numeral 108, will be leading the fault winding current in phase 'a' 106 by 120°, as designated by reference numeral 110. Thus, in the secondary, the phase 'a' current 112 is a vector sum of the normal winding current in phase 'a' 106 and the fault winding current in phase 'c' and 108, which is equal to 2 pu.

The relative phase displacement of the voltage vectors is determined by active and reactive power requirements. As an example, the phase relation for a purely inductive load is shown. In the secondary of the transformer, the current in phase 'a' 112 lags the voltage in phase 'a' represented by 114, by 90°, as designated by reference numeral 118. In the primary winding of the transformer, the net output power is proportional to current 100, voltage 114 and angle 120, and current 106 and voltage 116 (voltage in phase 'b' of secondary) and angle 122.

Figure 6:
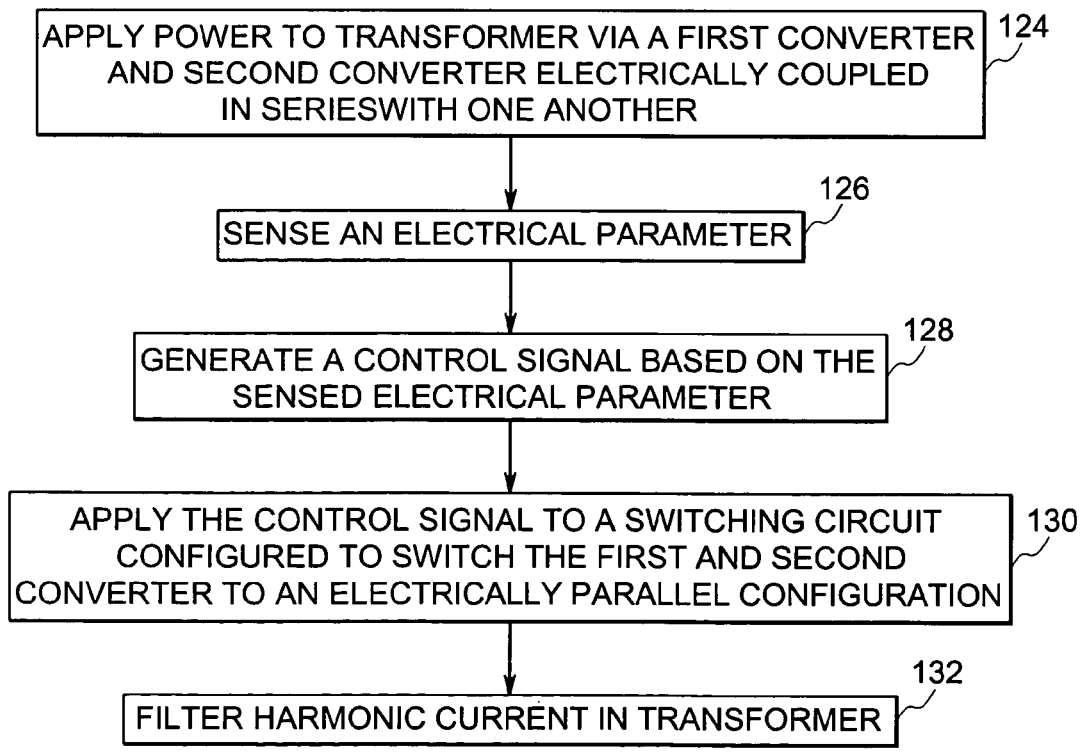
FIG. 6 is a flow chart illustrating one method for supplying power to a load.

FIG. 6 is a flow chart illustrating one method for supplying power to a load. In step 124, power is applied to a transformer via a first converter and second converter. The first converter and the second converter are coupled together in series. The transformer comprises a primary winding and a secondary winding. The primary winding comprises a normal winding and a fault winding. In a further embodiment, the first and second converters are coupled to the normal winding.

In step 126, an electrical parameter is sensed at the transformer, or in circuitry coupled to the transformer. Examples of electrical parameters include currents and voltages. In one embodiment, the electrical parameter is sensed across a secondary winding of the transformer. In another embodiment, the electrical parameter is sensed across a primary winding of the transformer.

In step 128, a control signal is generated based on the sensed electrical parameter. In one embodiment, the control signal is generated by control circuitry. In step 130, the control signal is applied to a switching circuit configured to switch the first and second converters to an electrically parallel configuration. In a further embodiment, the switching circuit is configured for coupling the converters to the normal winding and the fault winding of the transformer.

In step 132, harmonic current in the normal winding is sensed when the first and second converter are operating in the normal mode. The third converter is coupled to the fault winding and is configured to induce a current equal in magnitude to the harmonic current but of opposite phase. Thus the harmonic current is canceled and the output secondary current has minimum harmonics. In a further embodiment, the third converter is further coupled to generator to meet various application needs. In the illustrated embodiment, the third converter is coupled to the generator to provide a torque for a controlled rotation of the prime-mover to specific angular positions during assembly of the wind turbine blades or during maintenance of the wind turbine. In another embodiment, the third converter is configured for providing power to a gas-turbine generation system for achieving a controlled start-up. When the generator gains a certain speed, the third converter is disconnected from the machine terminals and the gas-turbine is fired to further accelerate the generator to its rated speed.

The above described invention has many advantages including supplying the fault current without exceeding the converter ratings, while reducing the need to over-design or over rate the circuitry. In addition, the cost of implementation of such a system is relatively low. The system provides high reliability for handling fault currents, and also provides control of the current in the converters. The system also provides for filtering harmonic distortion in the primary winding of the transformer without substantially increasing the size and weight of the system by minimizing the need for passive filtering. The system additionally uses the same converter for filtering as well as providing a start current for the generator, thus reducing the overall size, weight and cost of the system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power system for supplying power to a load, the power system comprising:
   a converter system comprising a first converter and a second converter; wherein the converter system is configured for operating in a first mode and a second mode; wherein the first converter and the second converter are configured to be coupled in series during the first mode, and in parallel when operating in the second mode; and
   a transformer having a primary winding comprising a normal winding and a fault winding, and wherein the normal winding is coupled to the first converter and the second converter during the first mode, and wherein the normal winding and the fault winding are coupled to the first converter and the second converter during the second mode; and
   a sensing circuit coupled to the transformer and configured to sense an electrical parameter of the transformer; wherein the electrical parameter comprises a voltage across the fault winding of the transformer or a current across a secondary winding of the transformer.

2. The system of claim 1, further comprising a switching circuit coupled to the transformer and configured to couple the fault winding to the converter system.

3. The system of claim 2, further comprising control circuitry coupled to the sensing circuit and the switching circuit, and configured to change a state of the switching circuit based on the sensed electrical parameter.

4. The system of claim 3, wherein the converter system further comprises a third converter coupled to fault winding and configured for canceling harmonic currents at an output of the transformer.

5. The system of claim 1, wherein the primary winding is wound in a zigzag pattern.

6. The system of claim 1, wherein the first converter and the second converter each comprise a rating of approximately half of a nominal power rating of the power system.

7. A power system for supplying power to a load, the power system comprising:
   a generator configured to generate a variable frequency output power;
   a converter system comprising a first converter and a second converter; wherein the converter system is configured for operating in a normal mode and a fault mode;

wherein the first converter and the second converter are configured to be coupled in series during the normal mode, and in parallel during the fault mode;

a transformer having a primary winding comprising a normal winding and a fault winding, and wherein the normal winding is coupled to the first converter and the second converter during the normal mode, and wherein the normal winding and the fault winding are coupled to the first convener and the second converter during the fault mode;

a switching circuit coupled to the transformer and configured to couple the fault winding to the converter system;

a sensing circuit coupled to the switching circuit and configured to sense an electrical parameter of the transformer; wherein the electrical parameter comprises a voltage across the fault winding of the transformer or a current across a secondary winding of the transformer; and control circuitry coupled to the sensing circuit and the switching circuit, and configured to change a state of the switching circuit based on the sensed electrical parameter.

8. The system of claim 7, wherein the converter system further comprises a third converter coupled to fault winding and configured for canceling harmonic currents in the output of the transformer.

9. The system of claim 8, wherein the third converter is coupled to the generator and is further configured for providing a torque for controlled motion of a prime mover in a wind turbine.

10. The system of claim 8, wherein the third converter is coupled to the generator is further configured for providing a power for a controlled start-up of a gas turbine.

11. The system of claim 7, wherein the primary winding is wound in a zigzag pattern.

12. A method for supplying power to a load, the method comprising:

sensing an electrical parameter;

coupling a first converter and a second converter in series during a first mode and in parallel during a second mode in response to the sensed electrical parameter; and coupling a normal winding of the transformer to the first converter and the second converter during the first mode, and the normal winding and a fault winding to the first converter and the second converter during the second mode.

13. The method of claim 12, further comprising canceling harmonic currents in the output of the transformer.

14. The method of claim 13, further comprising providing a torque for controlled motion of a prime mover in a wind turbine.

* * * * *

UNITED STATES PATENT AND TRADEMARK OFFICE
CERTIFICATE OF CORRECTION

| | | |
|---|---|---|
| PATENT NO. | : 7,414,331 B2 | Page 1 of 1 |
| APPLICATION NO. | : 10/813823 | |
| DATED | : August 19, 2008 | |
| INVENTOR(S) | : Datta | |

It is certified that error appears in the above-identified patent and that said Letters Patent is hereby corrected as shown below:

In Column 5, Line 4, delete "convener" and insert -- converter --, therefor.

In Column 5, Line 56, delete "convener" and insert -- converter --, therefor.

In Column 9, Line 9, in Claim 7, delete "convener" and insert -- converter --, therefor.

In Column 10, Line 6, in Claim 10, delete "is" and insert -- and is --, therefor.

Signed and Sealed this

Twenty-fourth Day of March, 2009

JOHN DOLL
*Acting Director of the United States Patent and Trademark Office*